United States Patent Office 3,118,490
Patented Jan. 21, 1964

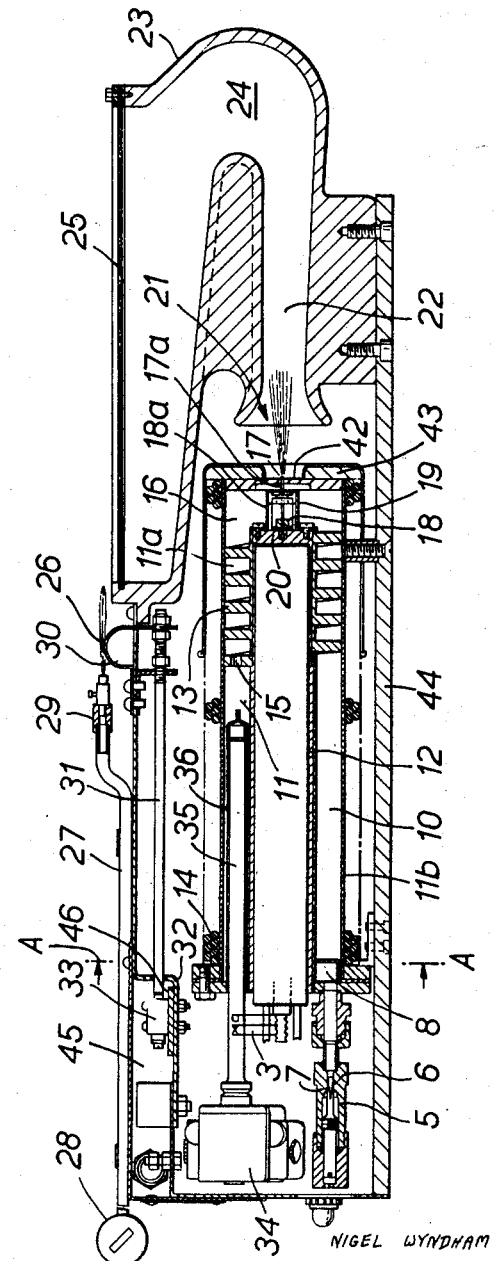

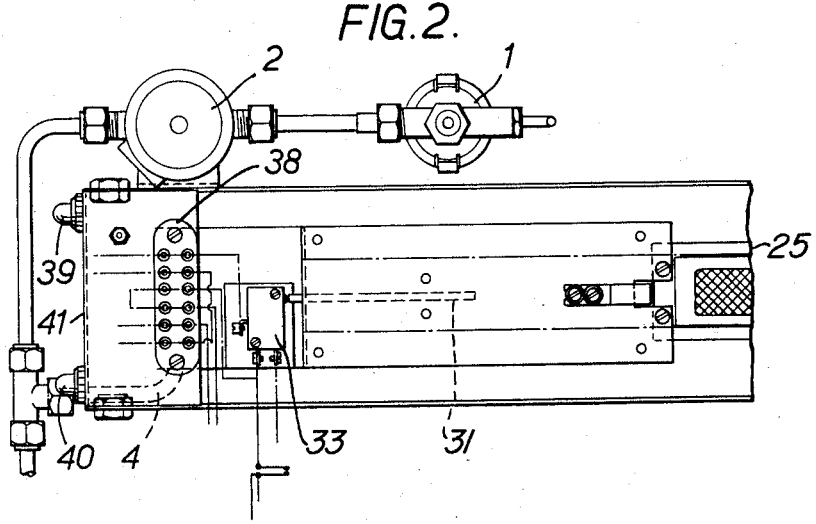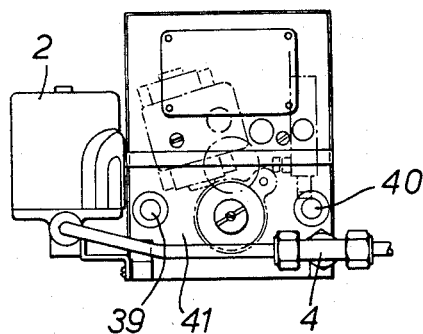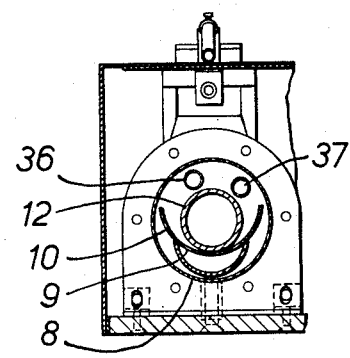

3,118,490
LIQUID-FUEL BURNING APPARATUS
Nigel W. H. Page-Roberts, Wimborne, Dorset, George Rhodes, Broadstone, Dorset, and Graham James Paull, Oakdale, Poole, Dorset, England, assignors to Doris Wykes, executrix of the late Frank Wykes, Poole, Dorset, England
Filed Aug. 21, 1961, Ser. No. 132,766
Claims priority, application Great Britain Aug. 22, 1960
5 Claims. (Cl. 158—28)

The present invention relates to vaporisers for or in liquid fuel burning apparatus, such as oil-fired apparatus for domestic or industrial heating, in which liquid fuel, such as paraffin or other suitable oil, is delivered under pressure and vaporised and mixed with air after delivery as a gaseous jet.

Such vaporisers comprising a casing providing a vaporising chamber containing a heater element with enclosed electric resistance means and having nozzle means for delivering a high velocity gaseous jet of the vaporised fuel have been proposed in United Kingdom Patent Nos. 843,203 and 858,876 and a liquid fuel burning apparatus designed for continuous operation and incorporating such a vaporiser has been described and claimed in United Kingdom specification No. 858,875, these patents having been published after the priority date of the present application.

The present invention aims to provide an improved vaporiser as above described and suitable for apparatus as above described which will operate with greater efficiency.

To this end the present invention provides a vaporiser suitable for supply by liquid fuel under pressure comprising a casing containing a heater element with enclosed electric resistance heating means, the heater extending along a trough in which liquid fuel can collect and be under the direct influence of the heater in a preliminary vaporising section of the vaporiser which communciates with a further section which is also exposed to the action of the heating element and receives vapours only from the preliminary section and further heats them, and nozzle means from which a high velocity gaseous jet of the vaporised fuel which has passed through said sections can be delivered for mixture with air.

Said further section may be a chamber, the walls of which are heated by the heater element and in which the vapours are compelled to traverse a helical path.

The preliminary section may be provided in an annular chamber around the heater element and the trough may be arranged therein in a raised position immediately or closely underlying the portion of the heater element in said section.

The heater element may be externally cylindrical and arranged co-axially with the casing, the trough immediately underlying the heater element and leaving a crescent-like space between it and the underlying section of the casing.

A vaporiser as aforesaid may be incorporated in a liquid fuel-burning apparatus adapted to deliver the liquid fuel to the vaporiser under pressure, and comprise thermo-switch means which operate to cut-off or restrict the liquid fuel flow to the vaporiser if the temperature of vaporisation falls below a predetermined magnitude.

Thermo-switch means may be provided which cut-off or restrict the heating power of the heater element if the temperature in the vaporiser exceeds a predetermined magnitude.

The vaporiser may be provided with a thermometer for indicating the temperature in the vaporiser.

An electrically-operated, e.g., solenoid-operated, valve may be provided for cutting off or restricting the liquid fuel flow in response to the first mentioned thermo-switch means and a manually operable control valve may be provided for regulating the flow of liquid fuel. A desired setting may be arranged and the apparatus then operates automatically.

A pricker means may be provided for cleaning the nozzle or orifices.

The fuel may be delivered under suitable pressure, say up to 10 lbs. gauge pressure, e.g., 6 lbs. gauge pressure, by a suitable pump, air pressure or other means, through an electrically controlled valve as aforesaid which is under the influence of a thermo-switch as aforesaid which is responsive to fall in the temperature in the vaporiser to cause the valve to stop or curtail the fuel flow when the said temperature falls to or below a predetermined magnitude. The manually operated valve aforesaid may be interposed between the electrically operated valve and the vaporiser to determine the cross-sectional area of a restricted orifice through which the liquid fuel must pass to the vaporiser from the said electrically operated valve.

The fuel allowed to pass by the said restricted orifice may collect in a small trough arranged in the interior of the vaporiser at one end thereof and communication with the trough first referred to herein arranged above it in the preliminary section of the vaporiser so that any residue liquid fuel which collects within the vaporiser will do so to a shallow level well below the inlet port or ports from the preliminary vaporising section to the helical section of the vaporiser and will be subjected to the heat of the heating element. The term "heating element" is used herein to include where the context of the claims permit, a single unit or two or more heating units.

The thermo-switch aforesaid for cutting out the heating element if the temperature of the vaporiser rises may operate within temperatures of 500 to 600° F., as a maximum, e.g., 550° F. and the thermo-switch which controls the aforesaid electrical valve may operate at a temperature from 400° F. to 500° F., e.g., 450° F.

The apparatus may be under the control of a suitable switch, e.g., a micro-switch and ignition may be automatic by gas flame or otherwise in such a manner that the micro-switch will be cut-in to set the apparatus in operation when the heat derived from the ignition source has reached a sufficient magnitude.

These and other features of the invention will be described in the following description with reference to the accompanying drawings in which:

FIG. 1 is a sectional elevation of the apparatus.
FIG. 2 is a plan view thereof with the cover removed.
FIG. 3 is an end view and
FIG. 4 a cross-sectional elevation on the line A—A of FIG. 1.

Referring to the drawings, the liquid fuel is delivered under pressure, e.g., by a suitable pump, at a gauge pressure of say up to 10 lbs., e.g., 6 lbs., preferably through a filter 1 and through an electrically-operated, e.g., solenoid, valve 2, which may be designed and arranged to operate in the manner of valve 21 referred to in the specification of the aforesaid patent No. 858,876 and under the control of a thermoswitch 3 which will be later herein referred to.

The liquid fuel from the valve 2 may lead to different ducts and a quantity is led off through a branch pipe 4 into a chamber 5 and thence through an orifice 6 which is controlled by a needle or other suitable manually controlled valve 7 into the vaporiser. It enters into a small end trough 8 in the vaporiser and thence passes through apertures 9 into another trough 10 extending along a preliminary vaporising chamber 11. The chamber 11 forming a preliminary vaporising section is an elongated chamber formed around a heater element 12 comprising a metallic sheath which contains an electrical resistance heating means. The chamber 11 communicates with a helical chamber 11a along which the heating element also extends. The heating element forms a core within the casing 11b of the vaporiser. The chamber 11a is defined by the casing 11, the sheath and a helical wall or rib 13 which is integral with or in good heat conducting connection with the metallic sheath 12 and may be in heat conduction relation to the casing 11b which forms the outer wall of the chambers and is lagged externally by the lagging 14. The helical wall or rib may be formed on a sleeve tightly fixed to the sheath 12 and forms therewith and with the enclosed electric resistance means a cartridge which can be applied as a unit. The fuel is preliminarily vaporised in the chamber 11 and passes through one or more apertures 15 into the helical chamber 11a and therein swirls round in contact with the hot surfaces of the helical chamber and is as it were, superheated when it leaves the helical chamber and collects under considerable static pressure in the chamber 16 provided with a nozzle orifice 17. The trough 10 immediately or closely underlies the heater element in the preliminary chamber 11 and forms a crescent shaped space with a section of the casing.

To keep the nozzle orifice as clear as possible during the operation of the apparatus when a continuous jet is to be delivered at high velocity under the influence of the pressure in chamber 16, when the apparatus is idle and each time it is cut-out a pricker or cleaning needle 17a supported in end bearing 18 passes through the jet orifice. An approximately C-shaped bi-metallic strip is anchored to the bearing 18 and its free ends engage a grooved boss 18a in which the pricker or cleaning element is secured, the pricker device being mounted in a bridge piece 19 attached to the closed end wall 20 of the aforesaid core.

The bi-metallic element is mainly controlled by the heat from the electrical resistance element so that when the temperature reaches a predetermined magnitude, the pricker is automatically withdrawn from the orifice before liquid fuel is introduced into the vaporiser and remains withdrawn so long as a suitable temperature prevails, as it will do continuously during the normal working of the apparatus. The pricker element is returned into the orifice when the temperature has cooled down sufficiently after cutting out the heating element and at a time when little or no gaseous fuel is present in the vaporiser.

Under the influence of the pump pressure and controlled by the restricted orifice provided by the manually operated valve 7, a quantity of liquid can be maintained in the end trough 8 and continuous vaporisation will take place in the vaporising chamber 11. The inlet or inlets to the helical chamber are arranged at the upper part of the helical wall or rib and any residue can collect in the wide trough 10 within the cylindrical casing of the vaporiser, but the helical chamber is separated therefrom save for the said inlet or inlets aforesaid and dry gaseous fuel will emerge from the helical chamber and collect in the pressure chamber 16 and this will be constantly maintained during normal working of the apparatus.

With the pricker retracted by the bi-metallic device a constant high velocity jet of gaseous fuel is continuously delivered through the jet orifice and this is delivered into the flared end 21 of a venturi tube 22 of a generally conventional type of burner 23. The high velocity jet draws air through the flared end 21 into the venturi and mixture of the fuel and air takes place in the mixing chamber 24 to allow burning at the gauze 25 over the mixing chamber outlet. Combustion can therefore take place away from the jet, and in the apparatus illustrated ignition takes place by a gas pilot flame 26, the gas being fed through a pipe 27 controlled by cock 28 and by way of a suitable adapter 29 to the outlet jet.

The gas flame heats a bi-metallic member 30 controlling a rod 31 guided in brackets 32 and connected to a microswitch 33, for automatically switching-in the complete unit when the gas flame has been in operation for a suitable period.

The aforesaid thermoswitch 3 is fixed in good heat conducting relation to the heater element and is responsive to a temperature of say between 400 to 500° F., e.g., 450° F., through suitable electrical connections to close the solenoid valve or cause this to produce a desired restriction of flow of fuel if the temperature of the vaporiser falls to this level or below, so that automatic control of the fuel flow is produced once the manual valve has been set.

A further thermoswitch 34, 35 (normally closed) has a tubular portion extending in a pocket 36 along the vaporising chamber 11 and this thermoswitch may be connected to cut-out the heater element if the temperature in the vaporising chamber rises to a given maximum temperature say a temperature between 500° F. and 650° F., e.g., 550° F.

A thermometer 37 may also be arranged in another pocket in the vaporising chamber 11 and provide suitable visual indication of the temperature prevailing in the said chamber.

The various electrical connections may be made to a common terminal box 38, the wiring being indicated in FIG. 2. This may include conducting lines to indicator lamps 39, 40, one being a white lamp indicating what power is being transmitted to the heating element and the other a red warning or danger lamp. The purpose of the white lamp is primarily for setting the thermostat controlling the temperature of vaporisation and having adjusted the temperature settings the lamp may be shielded.

The plate 42 providing the jet orifice may be provided with a lagged end over 43 suitably centrally apertured for the free passage of the jet.

The vaporiser and the burner may be mounted as shown on a common base plate 44.

The micro-switch and the terminal box may be arranged in a suitable compartment 45 in the encased apparatus, the micro-switch being conveniently mounted on a heat-insulating, e.g., asbestos mount 46.

What we claim is:

1. A vaporiser comprising a casing, a heater element with electric resistance heating means therein, a trough member along which the said heater element extends and in which liquid can collect and be under the direct influence of the heater element, a vaporising chamber formed around said heater element comprising an annular chamber around a portion of said heater element in which said trough member is arranged in a raised position closely underlying said portion and a second annular vapor-heating section which is formed by a fine pitch helical passage around another portion of said heater element and is exposed to the action of the heater element, communication means between the said sections arranged so that the second section receives the vapours only from the preliminary section and further heats them, and means from which a high velocity gaseous jet of the fuel which has passed through said sections can be delivered for mixture with air.

2. A vaporiser according to claim 1 in which the heater element is externally cylindrical and arranged co-axially with the casing, the trough immediately underlying the heater element and leaving a crescent like space between it and the underlying section of the casing.

3. A liquid fuel burning apparatus adapted for continuous operation comprising: a vaporizer casing having a vaporization section and a vapor heating section; means for delivering liquid fuel into said vaporization section under superatmospheric pressure; electric heating means within said sections; a trough within said vaporization section for collecting liquid fuel delivered to said casing and along which the electric heating means extends for direct exposure to liquid fuel in said trough; communication means between said sections arranged so that the vapor heating section receives only the vapors from the vaporization section; means within said vapor heating section defining a vapor passageway exposed to the heating means for heating vaporized fuel to set up such a pressure that the liquid fuel, although delivered under superatmospheric pressure, does not have access to said vapor-heating section; means responsive to the temperature within said casing for reducing the flow of liquid fuel into the vaporization section when said temperature falls below a predetermined magnitude, thereby preventing flooding of liquid fuel into said vapor-heating section when the temperature in said casing is insufficient to prevent such flooding; means associated with said vapor-heating chamber defining a high velocity gas jet opening for the fuel vapor; a mixing chamber for mixing fuel vapor from said jet opening with air; and a burner associated with said mixing chamber and spaced remotely from said vaporizer casing a sufficient distance such that the heat for vaporizing the liquid fuel is independent of the heat at the burner.

4. Apparatus as in claim 3 wherein said means for reducing the flow of liquid fuel into the vaporization section includes an electrically operated control means associated with said fuel delivery means and thermo-switch means for controlling said valve, said apparatus further comprising another thermo-switch means which controls the heating power of the heating means if the temperature in said casing exceeds a predetermined magnitude.

5. Apparatus as in claim 3 wherein said vapor passageway is an annular, fine pitch helical passageway around a portion of said heating means.

References Cited in the file of this patent

UNITED STATES PATENTS

| | | |
|---|---|---|
| 1,427,059 | Bridgeford | Aug. 22, 1922 |
| 1,514,773 | Kise | Nov. 11, 1924 |
| 2,073,552 | Curioni | Mar. 9, 1937 |
| 2,564,384 | Wales | Aug. 14, 1951 |
| 2,605,821 | Lindahl | Aug. 5, 1952 |
| 2,802,520 | Trabilcy | Aug. 13, 1957 |

FOREIGN PATENTS

| | | |
|---|---|---|
| 338,268 | Switzerland | June 30, 1959 |